United States Patent [19]

Pagdin et al.

[11] 4,022,084
[45] May 10, 1977

[54] CONTROL COUPLINGS

[75] Inventors: Brian Colin Pagdin, Sutton Coldfield; Oswald Webb, Coventry; Anthony Peter Roylance Rolt, Stratford on Avon; Frederick James Walker, Banbury, all of England

[73] Assignees: GKN Transmissions Limited, Erdington; Harry Ferguson Limited, Moreton-in-Marsh, both of England

[22] Filed: May 9, 1975

[21] Appl. No.: 576,233

[30] Foreign Application Priority Data

May 9, 1974 United Kingdom ............ 20485/74

[52] U.S. Cl. .................................. 74/711; 192/57; 192/48.3
[51] Int. Cl.² .................... F16H 1/44; F16D 31/00; F16D 47/00
[58] Field of Search ............ 74/711, 710.5; 192/57, 192/58 B, 58 C, 48.3, 48.5

[56] References Cited

UNITED STATES PATENTS

| | | | |
|---|---|---|---|
| 3,760,922 | 9/1973 | Rolt et al. | 74/710.5 X |
| 3,869,940 | 3/1975 | Webb et al. | 74/711 |
| 3,923,113 | 12/1975 | Pagdin | 74/711 X |

Primary Examiner—Samuel Scott
Assistant Examiner—Lance W. Chandler
Attorney, Agent, or Firm—Spencer & Kaye

[57] ABSTRACT

A control coupling in which an enclosure houses first and second sets of mutually interleaved elements in a viscous fluid. The first and second sets of elements are arranged for rotation about a common axis and for driving connection with first and second rotatable members respectively. The quantity of liquid within the enclosure and the construction of the enclosure are such that, at a predetermined working temperature of at least 100° C, the pressure of the liquid in the enclosure rises substantially above ambient. At least one set of the elements is free to move in directions parallel to the common axis of rotation and at least one set of the elements is provided with facings of friction material.

5 Claims, 4 Drawing Figures

CONTROL COUPLINGS

BACKGROUND OF THE INVENTION

1. FIELD OF THE INVENTION

This invention relates to devices for controlling or limiting differences in angular velocity or angular acceleration between relatively rotatable members. Hereinafter, and in the appended claims, such a device is referred to as "a control coupling". Control couplings find use, inter alia, in controlling the relative rotation between parts of a differential gear, particularly an inter-axle differential gear in a four-wheel drive vehicle. The invention also relates to a four-wheel drive vehicle having an inter-axle differential gear associated with a control coupling.

2. DESCRIPTION OF THE PRIOR ART

Many proposals have been made for viscous shear couplings in which there are two relatively rotatable elements, one of which may be housing in which the other element is rotatable, the housing containing a certain amount of viscous fluid. Normally the housing is less than half filled with viscous fluid but when the coupling rotates, the viscous fluid is thrown outwardly by centrifugal force so as to provide a film of viscous liquid between at least the outer circumferential parts of the two elements. Often these couplings are intended to disconnect when a certain speed difference is reached and it has been proposed that when this speed difference is reached the effect of the centrifugal force will be such as to compress elements around the outside of the housing thus to allow the viscous fluid to move from between the plates and to disconnect the coupling.

It has also been proposed to have couplings which are temperature sensitive and which are particularly designed for driving the cooling fans of motor vehicle engines. Such couplings are associated with a temperature sensitive element in such a manner that if the temperature drops below a predetermined value the coupling is disconnected.

SUMMARY OF THE INVENTION

Control couplings of the present invention are to be distinguished from these many prior art proposals.

Thus, control couplings with which the invention is concerned, hereinafter referred to as being of the kind specified, comprise mutually interleaved elements arranged for rotation about a common axis within an enclosure containing a viscous liquid for transmitting torque between the sets of elements by means of viscous shearing of the viscous liquid, alternate ones of said elements constituting a first set of elements for driving connection with a first rotatable member and remaining ones of said elements constituting a second set of elements for driving connection with a second rotatable member. In such a coupling the quantity of liquid within the enclosure and the construction thereof will be such that, at a predetermined working temperature of at least 100° C, the pressure of the liquid in the enclosure rises substantially above ambient for the reasons explained below.

We have found that couplings of the type specified exhibit a sudden increase in capability of torque transmission when the liquid pressure in the enclosure rises substantially above ambient pressure. When such a coupling is in use, energy will be dissipated in the coupling which will cause a rise in temperature thereof. The rise in temperature causes expansion of the liquid and the coefficient of thermal expansion of the liquid is so much greater than that of the material of the enclosure that, at a predetermined working temperature of at least 100° C, the pressure of liquid within the enclosure rises substantially above ambient.

The present invention is based on the discovery that if the elements of at least one of said sets are allowed to move parallel to said common axis, the above mentioned rise in pressure of the liquid causes axial movement of the movable elements so that adjacent elements from the two sets come into contact and the coupling acts in the manner of a wet clutch thus significantly increasing the torque transmitting capability thereof. To date we have found no entirely satisfactory explanation of why this movement takes place. It would be thought that the liquid pressure would be equal and effective in all directions within the enclosure so that there would be no more tendency for the elements to come into contact when the liquid is at high pressure than when it is at low pressure. The result is therefore unexpected, it may be due to instability in the pressure levels at different parts of the enclosure but we do not wish to be bound by this explanation.

Therefore according to the invention we provide a control coupling of the kind specified in which the elements of at least one set are free to move in directions parallel to said common axis and the elements of at least one set are provided with facings of friction material for transmitting torque between the sets of elements by means of frictional engagement as in a wet clutch.

The torque transmitting characteristic of a control coupling having this feature is particularly useful in a four-wheel drive vehicle having a combination of a control coupling and an inter-axle differential in that, should there be some failure of the drive element from the differential to one of the axles, the other axle will continue to drive. Moreover, should there be a failure of the front or rear brakes of such a vehicle, the non-braked wheels will tend to be retarded by the braked wheels due to the torque transmitted by the coupling.

The facings of friction material give a usefully high torque transmitting capability to the coupling when adjacent elements thereof are in contact and the coupling is acting as a wet clutch.

We have found that if all the elements are free to move parallel to the common axis the increase in torque transmitting capability due to the elements and friction facings coming into mutual frictional contact occurs earlier than would occur under the same conditions in a coupling embodying the invention in which the elements of only one set are free to move in directions parallel to said common axis. It is thus possible to control, by deciding whether to allow all the elements freedom to move or only the elements of one set, the time at which the above mentioned increase in torque transmitting capability can be brought about.

Preferably, therefore, both sets of elements are free to more parallel to the common axis. If desired both sets of elements may be provided with facings of friction material.

According to another aspect of the invention we provide a control coupling according to the first aspect of the invention in combination with a differential gear and in which the first and second sets of elements are respectively connected to relatively rotatable parts of the gear.

According to a further aspect of the invention, we provide a four-wheel drive vehicle having front and rear driven axles and an inter-axle differential gear wherein the inter-axle differential gear is associated with a control coupling embodying the first aspect of the invention.

BRIEF DESCRIPTION OF THE DRAWINGS

The present invention will now be described by way of example with reference to the accompanying drawings whereof.

DESCRIPTION OF THE PREFERRED EMBODIMENT

Figure 1:
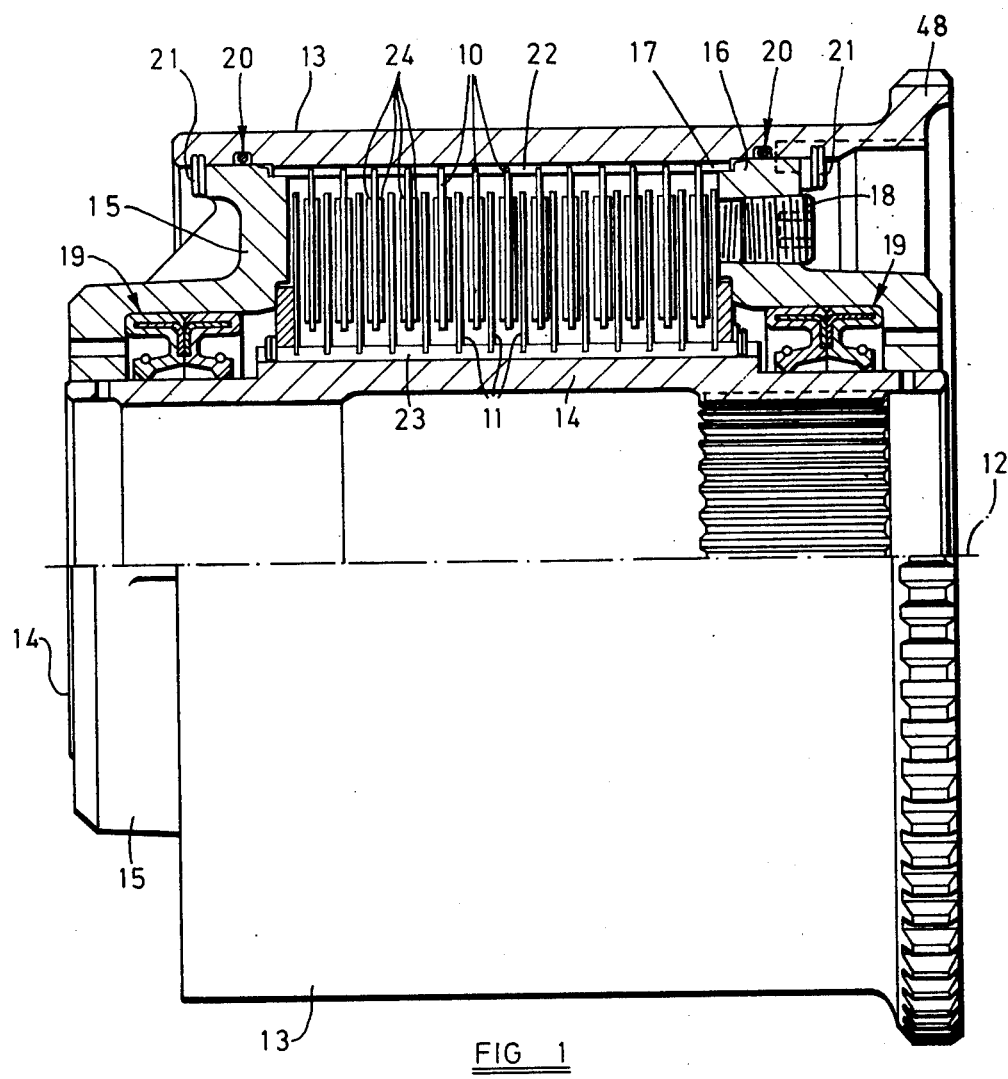
FIG. 1 is a part-sectional elevation of a control coupling in accordance with the present invention.

In FIG. 1 of the drawings, a control coupling for limiting freedom of differential action of an interaxle differential gear in a motor vehicle transmission (an example of which is hereinafter described) consists of mutually spaced and mutually interleaved elements in the form of "outer" and "inner" annular plates 10 and 11 respectively. The plates 10, and 11 are made of steel and are arranged for rotation about a common axis 12 within an enclosure defined by relatively rotatable mutually concentric cylindrical walls 13 and 14 with co-operating end plates 15, 16. The enclosure contains a viscous fluid (not illustrated) admitted by way of a filling hole 17 closed by a plug 18, and retained by means of seals indicated at 19 and 20. The end plates 15, 16 are held by retaining rings 21. The outer plates 10 are toothed at their outer peripheries and are in driving engagement with the outer wall 13 by way of axial splines 22 on the inner surface of wall 13. The inner plates 11 are internally toothed and are in driving engagement with the inner wall 14 by way of axial splines 23 on the radially outer surface of wall 14. The walls, 13, 14 are adapted for driving connection with first and second relatively rotatable members constituted by two members of a differential gear as hereinafter explained. The plates of each set of outer and inner plates 10, 11 are free to move in directions parallel to the common axis 12 along the splines 22 and 23 while being keyed for rotation with the walls 13 and 14. Each of the plates 10 has, on each surface thereof, a facing of friction material indicated at 24. This friction material may be, for example, asbestos paper which is cemented to the plate and has a thickness of 0.01 inches and coefficient of friction of approximately 0.25 when in a dry and static condition. Certain sintered friction materials are also suitable for use.

The term "friction material" as used throughout this specification should be construed broadly as covering materials which are different from the material of the plates or elements and which have the desired coefficient of friction, and the necessary resistance to wear and seizure at the operating temperatures encountered at the interfaces between the friction facings and the engaging plates or elements where slippage occurs when the coupling is operating as a wet clutch as described below. These interface temperatures may be up to and above 600° C.

The spaces on opposite sides of each of the plates 10, 11 may be in fluid communication by way of openings (not shown) through the working surfaces of the plates. Alternatively, the plates may be imperforate.

The viscous fluid is a silicone fluid preferably having a nominal viscosity of 30,000 centi-stokes to 60,000 centi-stokes i.e. a viscosity of this value at a temperature of 25° C, and zero shear rate. However, the nominal value of viscosity may be above or below these figures depending upon the operating characteristics required and may be, for example, as low as 5,000 centi-stokes or as high as 100,000 centi-stokes. One example of a suitable silicone fluid is that marketed by the Dow Corning Company under the number X2-1073. The fluid is preferably introduced by a vacuum-filling process. After filling, a percentage of the contained fluid may be removed, for example by heating the entire coupling to, say, 100° C, in order to adjust the torque characteristics by controlling the working temperature at which the pressure developed in the enclosure is sufficient to cause the control coupling to act as a wet clutch by causing the plates to move into contact with one another.

Figure 2:
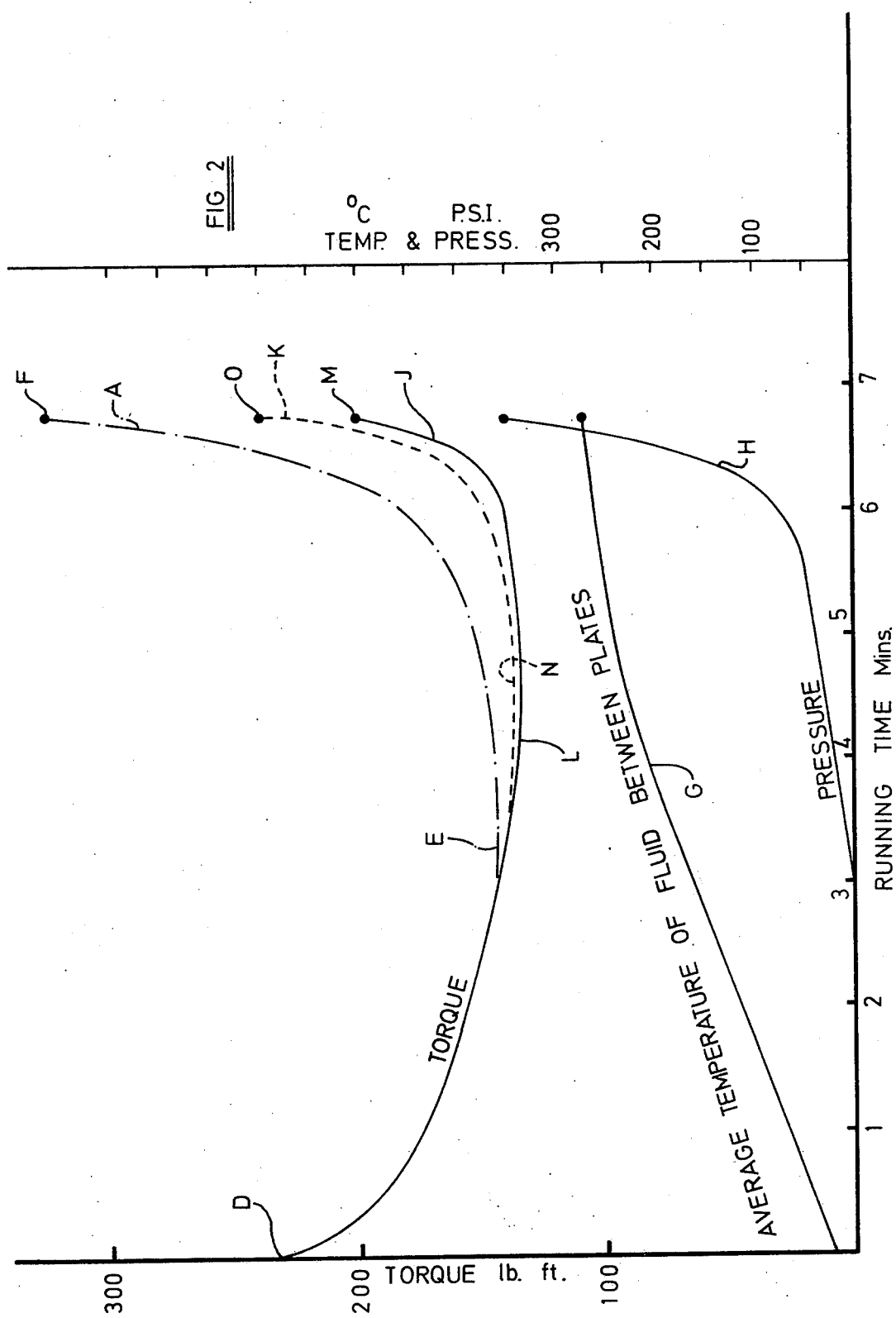
FIG. 2 shows graphs of torque, temperature and pressure in relation to running time for a control coupling embodying the present invention as compared with other control couplings.

We have found that if there is a constant speed difference between the parts of the coupling i.e. between the walls 13 and 14, the torque transmitting characteristic is as shown by the typical graph A in FIG. 2.

Graph A shows that the torque transmitted at the beginning of a period of relative rotation between the parts is high at point D and, with passage of time, decreases to a minimum value at point E. The time interval between D and E may, for example, be of the order of two to three minutes. Continued rotationproduces a rapid increase in torque transmitting capability up to the torque value of F.

For a given control coupling, the time interval between the points D and E is dependent on the rate of heat input into the coupling. Thus, for example, if the coupling is subjected to very severe usage experiments have shown that this time interval may be as short as 7 seconds while considerably lighter usage may extend this time interval to 15 minutes or more.

We believe that the explanation of this characteristic is as follows. The torque initially decreases due to the decreased viscosity of the fluid as the temperature rises during continued operation of the coupling as shown by Graph G. As the temperature rises the fluid expands and the pressure within the enclosure rises as shown in Graph H and this causes adjacent elements to move into contact with one another so that the coupling changes in effect from being a viscous shear coupling to becoming a wet clutch.

We have found that in a coupling in accordance with the present invention the pressure within the enclosure will typically rise, as indicated by the graph H, from an initial value of approximately ambient to a value in the range 100 to 600 p.s.i. In certain applications the pressure rise may be less than or greater than the range indicated above.

FIG. 2 shows two further graphs indicated at J and K respectively relating torque to running time in couplings similar tothat shown in FIG. 1 but in which, in both cases, the friction linings are omitted and in one case only one set of the elements is free to move. Thus Graph J is of a control coupling in which there are no friction linings on the plates and in which one set only of the plates are axially movable. As before, all the plates are made of steel. It will be seen that although the torque/time graph starts at D as does the Graph A, the Graph J reaches a much lower minimum value at about L before rising to a maximum at M which, it will be seen, is considerably less than the maximum F which is reached by a coupling embodying the invention.

Graph K relates to a coupling which is similar to that forwhich Graph J is drawn but in this case both sets of plates are axially movable. It will be seen that the minimum value of the torque for Graph K is at N which is considerably less than the minimum value E for Graph A and the maximum value reached is at O which again is considerably less than the maximum value at F for Graph A.

It will be seen, therefore, that the coupling of the invention has advantages in that, firstly, the maximum torque which can be transmitted is considerably greater than with couplings without the friction facings. Moreover, and more unexpectedly, the minimum torque transmitted is greater than with couplings without friction facings.

It would be desirable to have a substantially level torque/time characteristic for at least some applications with a steep increase towards the end of the working temperature range. It will be seen that Graph A more nearly approaches such a desirable characteristic than does Graph J or Graph K.

Figure 3:
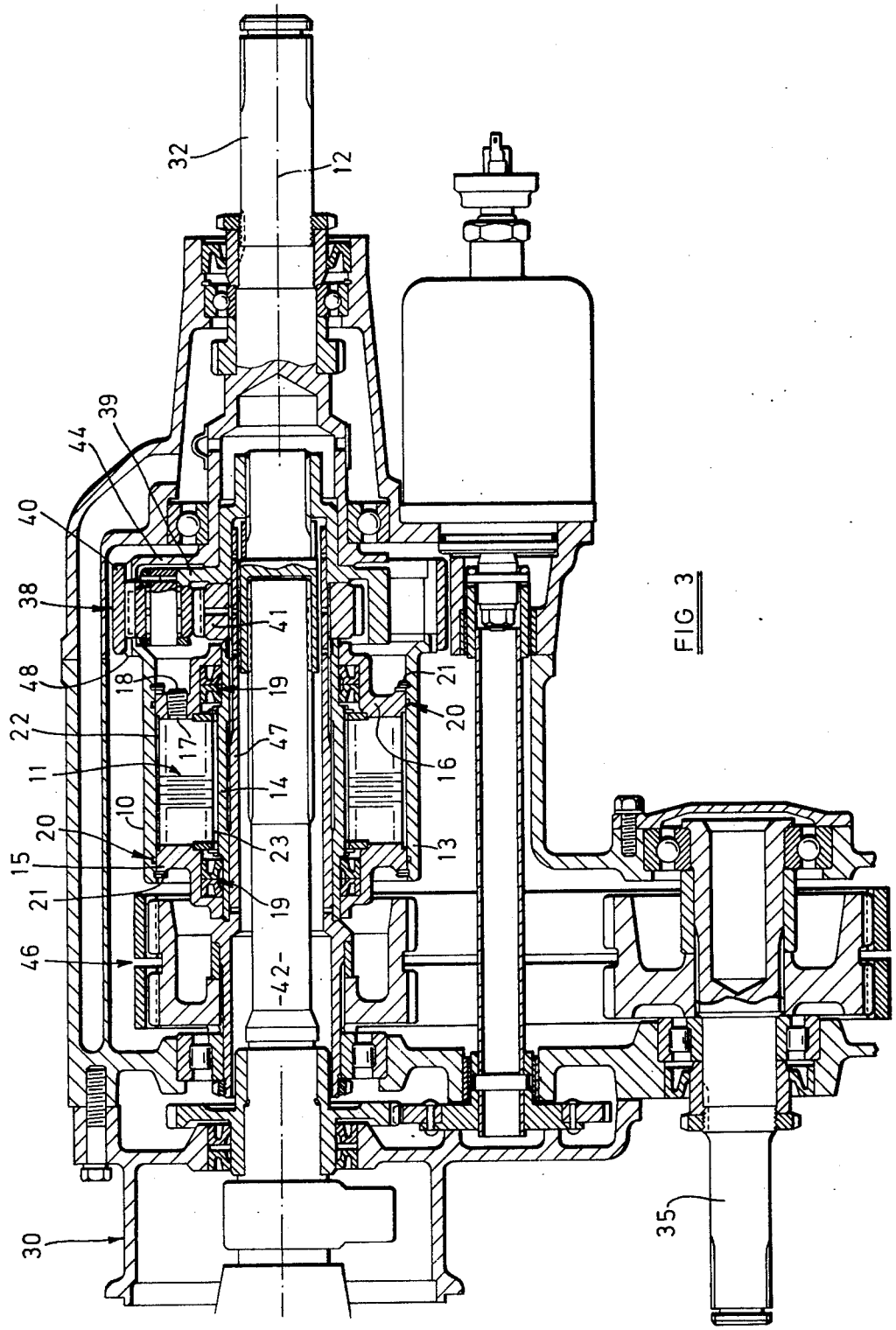
FIG. 3 is a sectional elevation of part of a motor vehicle transmission incorporating a control coupling in accordance with the present invention.
Figure 4:
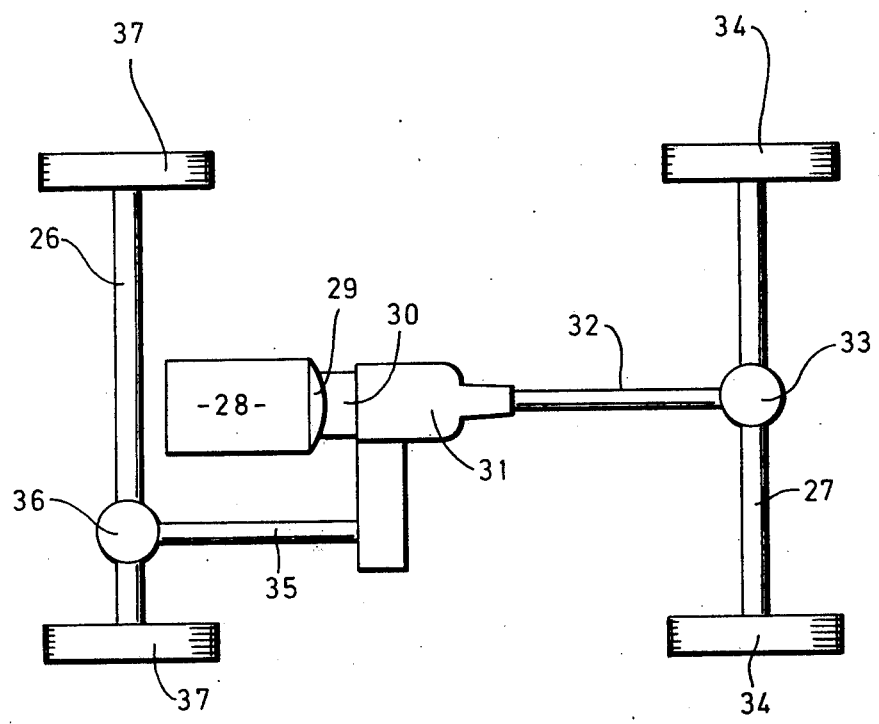
FIG. 4 is a diagram illustrating the application of the transmission of FIG. 3 to a four-wheel drive vehicle.

FIGS. 3 and 4 show the control coupling of FIG. 1 applied to control the interaxle differential of a four-wheel drive vehicle shown diagrammatically in FIG. 4. The vehicle comprises a driven front axle 26 and a driven rear axle 27. The prime mover is indicated at 28, a clutch housing at 29, a change speed gearbox at 30 and an assembly of differential gear, control coupling and transfer box at 31. The assembly 31 will be described below in relation to FIG. 3. A drive shaft 32 connects the assembly 31 to an interwheel differential 33 of the rear axle 27 and the rear wheels 34 are driven via the interwheel differential 33. Similarly, a drive shaft 35 extends forwardly from the assembly 31 to an interwheel differential 36 in the front axle 26 from which are driven the front wheels 37.

Referring now to FIG. 3, the control coupling above described is shown incorporated in the assembly 31 which includes an interaxle differential gear 38 for distributing drive to front and rear pairs of road wheels 37 and 34. The differential gear 38 is of the planetary spur type whereof a planet carrier 39 is the input driven from the prime mover 28, the annulus gear 40 is the output to the rear set of road wheels 34, and the sun gear 41 is the output to the front set of road wheels 37. The planet carrier is driven by way of an input shaft 42 co-axial with the axis 12 of the control coupling and driven from the change speed gear box 30. The drive shaft 32 is connected to the annulus 40 by way of flange 44 having the peripheral teeth engaged with the annulus 40. The front drive shaft 35 is connected to the sun gear 41 by way of a chain-and-sprocket drive transfer 46 and tubular shaft 47 to which the sun gear is splined. The control coupling is mounted co-axially with the differential gear 38, the outer wall 13 of the coupling having a peripherally toothed flange 48 engaged with the annulus 40. The inner wall 14 of the coupling is splined to the tubular shaft 47 and is thus in driving connection with the sun gear 41.

During operation of the assembly of FIG. 3, the differential gear 38 normally rotates with no differential action or with a relatively small degree of differential action during vehicle cornering and due to slight difference in effective road wheel diameters between front and rear. This relatively small degree of differential action involves relatively low values of speed difference between the annulus gear 40 and the sun gear 41, such speed difference developing a torque transmission value within the control coupling sufficiently low to constitute an insignificant impedance to the action of the differential gear 38. In the event of a tendency towards front or rear road wheel spin during drive, or lock during braking, a relatively large degree of differential action in the differential gear 38 is opposed or limited by the development in the control coupling of a relatively high torque transmission value which provides an effective coupling of the front and rear wheels and inhibits wheel spinning or locking. The transmission operates as described in both forward and reverse drive.

Should the vehicle find itself in a position in which relative rotation between the two sets of wheels 34, 37 takes place for some length of time, then the torque transmitted by the coupling will decrease initially as described in relation to Graph A of FIG. 2 and then will increase. This increase may be useful to extricate the vehicle from a difficult situation. Also, if there is some failure in the drive to one of the pairs of wheels, the torque transmission between the parts of the coupling may be such to enable the vehicle to be driven only by the remaining pair of wheels since the coupling will provide a reaction member for the iner-axle differential. Finally, if one set of the front and rear brakes should fail, the torque transmission by the coupling may allow the braked wheels to retard the unbraked wheels.

It will be seen that the invention provides an improved control coupling which has useful application to control relative rotation between two members of a differential gear. Moreover, such a differential gear has extremely useful properties when employed as an inter-axle differential gear in a four-wheel drive vehicle.

We claim:

1. A control coupling comprising an enclosure, first and second sets of mutually interleaved elements within said enclosure and arranged for rotation about a common axis, a viscous liquid within said enclosure for transmitting torque between the sets of elements by means of viscous shearing of the viscous liquid said first and second sets of elements being arranged for driving connection with first and second rotatable members respectively, the quantity of liquid within said enclosure and the construction thereof being such that, at a predetermined working temperature of at least 100° C, the pressure of the liquid in the enclosure rises substantially above ambient, at least one set of said elements being free to move in directions parallel with said common axis, and at least one set of said elements being provided with facings of a friction material for transmitting torque between the sets of elements by means of frictional engagement as in a wet clutch.

2. A coupling according to claim 1 in which both sets of elements are free to move parallel to said common axis.

3. The combination of a control coupling as claimed in claim 1 with a differential gear in which said first and second sets of elements are drivingly connected to two relatively rotatable elements of said gear respectively.

4. The combination according to claim 3 wherein said differential gear is of the spur gear type having a sun gear, planet gears and an annulus gear and wherein said control coupling is connected between said sun gear and said annulus gear.

5. A four-wheel drive vehicle having front and rear driven axles and including the combination of a differential gear and control coupling according to claim 3 and in which said differential gear has two outputs which are connected to said front and rear driven axles respectively.

* * * * *